(12) United States Patent
Luo et al.

(10) Patent No.: US 11,074,517 B2
(45) Date of Patent: Jul. 27, 2021

(54) PREDICTING KEYWORDS IN AN APPLICATION

(71) Applicant: INTERNATIONAL BUSINESS MACHINES CORPORATION, Armonk, NY (US)

(72) Inventors: Yan Luo, Burlington (CA); Seana Hogan, Valley Springs, CA (US); Monvorath Phongpaibul, Bangkok (TH); John Carl DelMonaco, Wilmette, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 573 days.

(21) Appl. No.: 15/989,485

(22) Filed: May 25, 2018

(65) Prior Publication Data

US 2019/0362257 A1    Nov. 28, 2019

(51) Int. Cl.
*G06N 7/00* (2006.01)
*G06N 20/00* (2019.01)
*G06F 16/33* (2019.01)

(52) U.S. Cl.
CPC .......... *G06N 7/005* (2013.01); *G06F 16/3346* (2019.01); *G06N 20/00* (2019.01)

(58) Field of Classification Search
CPC .. G06F 16/313; G06F 16/3334; G06F 16/335; G06F 16/338; G06F 16/90344; G06F 3/0481; G06F 3/0486
USPC ........................................................ 706/12
See application file for complete search history.

(56) References Cited

U.S. PATENT DOCUMENTS

| | | | |
|---|---|---|---|
| 5,526,443 A | * | 6/1996 | Nakayama ............ G06F 16/338 382/229 |
| 7,831,608 B2 | | 11/2010 | Aizenbud-Reshef et al. |
| 2004/0243557 A1 | * | 12/2004 | Broder .................... G06F 40/30 |
| 2011/0145005 A1 | | 6/2011 | Cao |
| 2011/0179026 A1 | | 7/2011 | Mulligun et al. |
| 2012/0124547 A1 | | 5/2012 | Halbedel |

(Continued)

FOREIGN PATENT DOCUMENTS

WO    2017134665 A1    8/2017

OTHER PUBLICATIONS

Haumer et al., "Discovering and Displaying Business Artifact and Term Relationships," U.S. Appl. No. 16/123,131, filed Sep. 6, 2018.

(Continued)

*Primary Examiner* — Jonathan Han
(74) *Attorney, Agent, or Firm* — Cantor Colburn LLP; Teddi Maranzano

(57) ABSTRACT

A computer-implemented method includes training a classification model to produce a mapping from a set of feature vectors to a set of confidence levels. Each feature vector describes a respective term, and each confidence level indicates a likelihood that the respective term is a keyword. A plurality of program artifacts are tokenized into a plurality of terms. For each term in the plurality of terms, a respective feature vector is determined for describing the term, based on the plurality of program artifacts. For each term in the plurality of terms, based on the respective feature vector, using the mapping, a respective confidence level is determined for indicating a likelihood that the term is a keyword of the plurality of program artifacts.

17 Claims, 4 Drawing Sheets

(56) References Cited

U.S. PATENT DOCUMENTS

| | | | |
|---|---|---|---|
| 2013/0110861 A1 | 5/2013 | Roy et al. | |
| 2013/0282363 A1* | 10/2013 | Fan | G06F 40/55 |
| | | | 704/9 |
| 2014/0164399 A1* | 6/2014 | Mandelstein | G06F 16/36 |
| | | | 707/749 |
| 2014/0282373 A1 | 9/2014 | Garza | |
| 2017/0163518 A1* | 6/2017 | Dube | H04L 41/5054 |

OTHER PUBLICATIONS

List of IBM Patents or Patent Applications Treated as Related; Date Filed: Sep. 6, 2018, 2 pages.

Putrycz et al. "Connecting Legacy Code, Business Rules and Documentation," RuleML 2008, LNCS 5321, pp. 17-30, 2008, Springer-Verlag, 2008, pp. 1-14.

Ronen et al., "Service Identification in Legacy Code Using Structured and Unstructured Analysis," IBM Haifa Research Lab, IBM, May 2007, pp. 1-23.

\* cited by examiner

PREDICTING KEYWORDS IN AN APPLICATION

BACKGROUND

The present invention relates to business rule mining and, more specifically, to predicting keywords in an application, such as a legacy application.

Business rule mining is a process of discovering business logic, such as how car insurance premiums are calculated or how medical records are registered, incorporated into application code. Mining business rules can be particularly difficult in legacy applications, such as those including mainframe COBOL program artifacts. Legacy applications can be old and complex, and may not be organized and maintained in the same ways that new or smaller applications might be. Discovered business rules can be converted into natural language and analyzed by business analysts or architects, so that they can be validated, tracked, and updated over time.

An early step in discovering business rules is identifying keywords in legacy applications, as business rules usually incorporate keywords. However, program artifacts of legacy applications are not necessarily easy to understand by business analysts, and a legacy application may include a massive number of program artifacts. Software developers follow specific programming language syntax, grammars, and conventions to compose the program artifacts, and these must be translated into keywords and business logic before business analysts can begin to understand legacy applications.

SUMMARY

Embodiments of the present invention are directed to a computer-implemented method for predicting keywords. A non-limiting example of the computer-implemented method includes training a classification model to produce a mapping from a set of feature vectors to a set of confidence levels. Each feature vector describes a respective term, and each confidence level indicates a likelihood that the respective term is a keyword. A plurality of program artifacts are tokenized into a plurality of terms. For each term in the plurality of terms, a respective feature vector is determined for describing the term, based on the plurality of program artifacts. For each term in the plurality of terms, based on the respective feature vector, using the mapping, a respective confidence level is determined for indicating a likelihood that the term is a keyword of the plurality of program artifacts.

Embodiments of the present invention are directed to a system for predicting keywords. A non-limiting example of the system includes a memory having computer-readable instructions and one or more processors for executing the computer-readable instructions. The computer-readable instructions include training a classification model to produce a mapping from a set of feature vectors to a set of confidence levels. Each feature vector describes a respective term, and each confidence level indicates a likelihood that the respective term is a keyword. Further according to the computer-readable instructions, a plurality of program artifacts are tokenized into a plurality of terms. For each term in the plurality of terms, a respective feature vector is determined for describing the term, based on the plurality of program artifacts. For each term in the plurality of terms, based on the respective feature vector, using the mapping, a respective confidence level is determined for indicating a likelihood that the term is a keyword of the plurality of program artifacts.

Embodiments of the invention are directed to a computer-program product for predicting keywords, the computer-program product including a computer-readable storage medium having program instructions embodied therewith. The program instructions are executable by a processor to cause the processor to perform a method. A non-limiting example of the method includes training a classification model to produce a mapping from a set of feature vectors to a set of confidence levels. Each feature vector describes a respective term, and each confidence level indicates a likelihood that the respective term is a keyword. Further according to the method, a plurality of program artifacts are tokenized into a plurality of terms. For each term in the plurality of terms, a respective feature vector is determined for describing the term, based on the plurality of program artifacts. For each term in the plurality of terms, based on the respective feature vector, using the mapping, a respective confidence level is determined for indicating a likelihood that the term is a keyword of the plurality of program artifacts.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
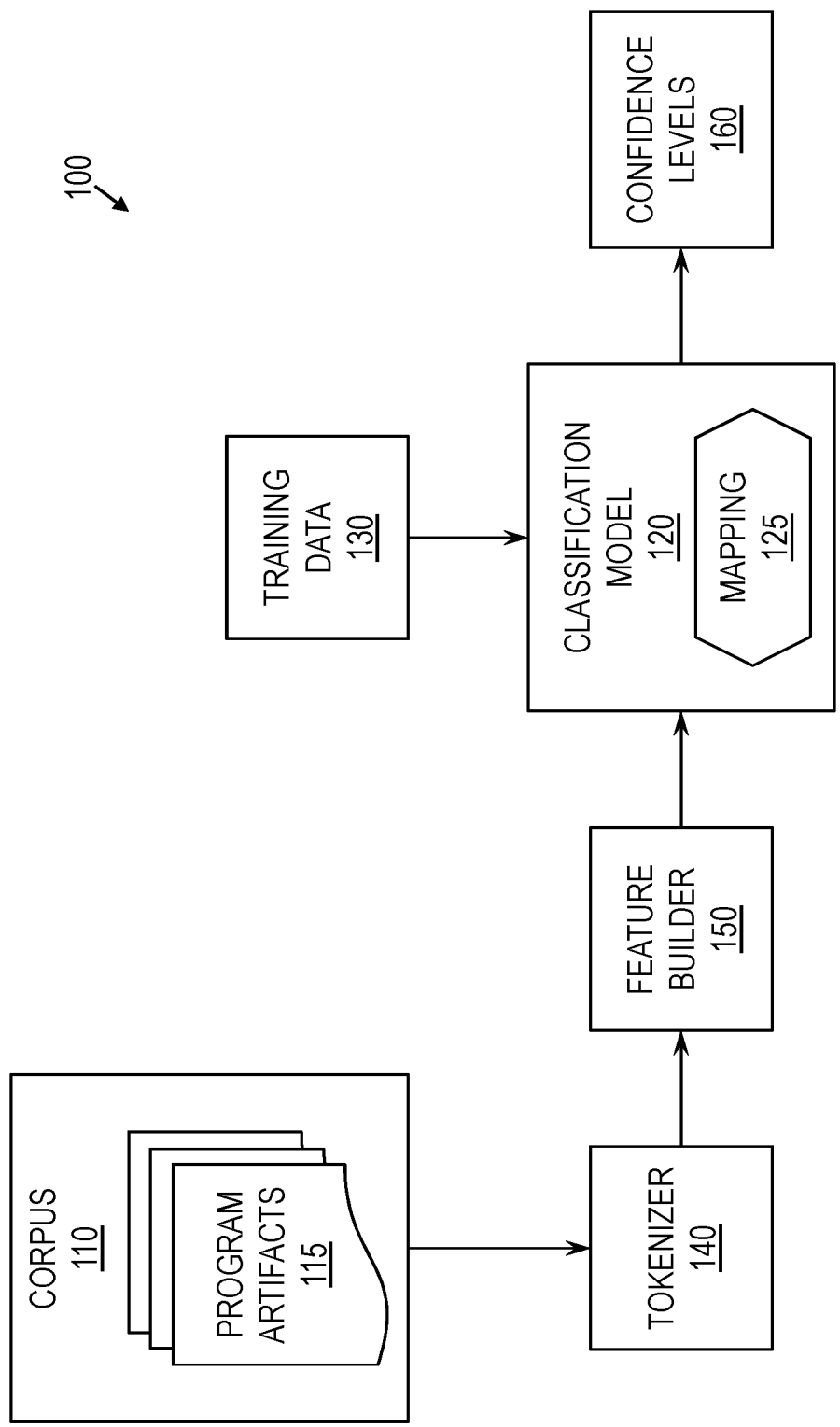
FIG. 1 is a block diagram of a prediction system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the differences between programming languages and natural language cause a communication gap between software developers and business analysts. For each program artifact in a legacy application, an analyst would need to manually find important terms (i.e., keywords) and associate them with business logic, which is a time-consuming and tedious process, especially if an analyst is not familiar with the legacy application or if the size of the legacy application is large.

Turning now to an overview of the aspects of the invention, one or more embodiments of the invention address the above-described shortcomings of the prior art by providing a framework to discover keywords in program artifacts automatically. After keywords are discovered, a business analyst or other user can then identify the business logic surrounding those keywords. According to embodiments of this invention, a prediction system provides a machine-learning framework for keyword discovery. Keywords are terms that have concise meanings and high relevance to topics in the legacy application. As such, keywords can be used to summarize program artifacts to enable a better understanding of business logic incorporated into a legacy application. To discover keywords, the prediction system may train a classification model with known keywords and feature vectors describing those keywords. The result may be a trained classification model that can determine a confidence level indicating the likelihood that a new term is a keyword. Further, the prediction system may tokenize program artifacts of a legacy application into terms, build a feature vector for each term, and submit each term to the trained classification model for determination of a confidence level that the term is a keyword. The result is an improvement to business rule mining, by way of a tool for automating the discovery of keywords.

Turning now to a more detailed description of aspects of the present invention, FIG. 1 is a block diagram of a prediction system 100 according to some embodiments of the invention. The prediction system 100 may predict, or determine, which terms in one or more program artifacts 115 of a corpus 110 are keywords. The corpus 110 may represent the whole of an application, such as a legacy application, being analyzed. As shown, the prediction system 100 may include a classification model 120. As described in more detail below, the classification model 120 is trained with training data 130 to produce a mapping 125. Generally, the classification model 120 may map a feature vector, which is associated with a term identified in a program artifact 115, to a confidence level 160. The confidence level 160 may be, or may represent, a likelihood that the associated term is a keyword.

The prediction system 100 may also include a tokenizer 140 and a feature builder 150, which together generate input for the classification model 120 based on one or more program artifacts 115. Generally, the tokenizer 140 may extract candidate terms from the program artifacts 115 of the corpus 110, and the feature builder 150 may build a feature vector for each candidate term. Each of the tokenizer 140 and the feature builder 150 may include hardware, software, or a combination of both. For instance, each of the tokenizer 140 and the feature builder 150 may be a software module or a specialized hardware circuit. Each candidate term and its associated feature vector may be submitted to the classification model 120, which may output a confidence level 160 indicating whether the candidate term is a keyword.

The tokenizer 140 may take as input one or more program artifacts 115 and may output a plurality of terms. In other words, the tokenizer 140 may tokenize the program artifacts 115. Each program artifact 115 may be a source file or portion of a source file that is incorporated into a program, such as a legacy application. For example, and not by way of limitation, a program artifact 115 may be a source code file, a MAP file, a copybook, or a library. A term may be a one-word phrase representing an entity or concept in a program artifact 115. For example, and not by way of limitation, a term may be a variable name, a constant value, a symbol, or a word in comments. In some embodiments of the invention, the tokenizer 140 is, or incorporates, a simple scanner or parser known in the art. Existing simple scanners and parsers are able to extract terms from program artifacts 115.

Some terms are reserved in certain languages. For example, the terms "public," "private," and "class" are reserved in the programming language Java, while the terms "a," "an," and "the" are reserved in the English language. These reserved terms typically do not convey useful or substantive information, but they serve a purpose within the language. Some embodiments of the prediction system 100 assume that reserved terms are not keywords, and thus the tokenizer 140 may remove reserved terms from consideration. This may require knowledge of the programming languages used in the program artifacts 115. Thus, the tokenizer 140 may have access to a list of reserved terms in each programming language to enable recognition of those terms. In some embodiments of the invention, reserved terms may be ignored when terms are being extracted, or alternatively, reserved terms may be removed from the set of terms identified after terms are extracted from the program artifact 115. The remaining terms, which are not reserved, may be referred to as candidate terms.

For instance, an example COBOL statement is as follows: "MOVE DB2-PATIENT-ID TO CA-PATIENT-ID. COPY HCERRSPD." After tokenization, including the removal of the reserved terms MOVE, TO, and COPY, the remaining candidate terms are the following: {DB2-PATIENT-ID, CA-PATIENT-ID, HCERRSPD}.

The feature builder 150 may input one or more terms, which may be candidate terms, and may output a feature vector for each term. A feature vector may be an ordered set of feature values, including a respective value in each field. Each field represents a specific feature, which is a measurable property or metric. The feature builder 150 may examine the various program artifacts 115 to evaluate the features to be included in the feature vector. Because each feature is a measurable property, one of skill in the art will understand how to construct such the feature builder 150 to establish the value of each feature for each term. Informative, discriminating, and independent feature vectors can be useful in differentiating important terms from unimportant ones. In some embodiments of the invention, each feature represented in a feature vector is a factor that is being considered for determination of whether terms are keywords.

In some embodiments of the invention, the features represented in a feature vector include a subset of language-independent features and language-dependent features. The language-independent features are independent of the programming language in which a term is written. Program artifacts 115 are written either directly or indirectly by humans, and thus certain features are related to characteristics of natural language, regardless of the specific language in which a program artifact 115 is written. In contrast, language-dependent features are relevant to a specific programming language. Syntax, styles, and conventions vary across programming languages. Thus, accuracy can be improved in discovering keywords by the consideration of language-dependent features that are selected with awareness of an applicable programming language. While the features considered as a whole may vary from one embodiment of the invention to another, the language-dependent features may further vary based on the program languages of the program artifacts 115. Although this disclosure refers to the use of both language-independent and language-dependent features, it will be understood that some embodiments of the invention may utilize only language independent features, or only language-dependent features.

For example, language-independent features represented in a feature vector may be one or more of the following, which will be described in more detail below: term length, term frequency, document frequency, first appearance, and Term Frequency-Inverse Document Frequency (TF-IDF).

Term length refers to the length of a term, which may be the number of characters in the term. One reason this feature may be considered is that short terms and long terms may be less likely to be keywords than are terms of moderate length.

Term frequency refers to the number of appearances a term makes within a particular program artifact 115, or within the various program artifacts 115 in the corpus 110. The term appears in multiple program artifacts, then the highest frequency may be used as the value of this feature.

Document frequency refers to the number of program artifacts 115 in the corpus 110 in which a term appears. If a term appears in many program artifacts 115, then the term is likely important and thus likely a keyword.

First appearance refers to the position of the first appearance of the term within a program artifact 115. For instance, a value used to represent the first appearance may be a line number or character position. If the term appears in multiple program artifacts 115 of the corpus 110, then the value of this feature may lowest line number, or character position, at which the term appears in any program artifact 115. Often, important terms and variables are defined toward the beginning of a program artifact 115, and thus the first appearance can be indicative of a term's importance.

TF-IDF is a popular statistical measurement of term importance. Generally, TF-IDF increases proportionally to term frequency with a program artifact 115 and is offset by the frequency of the term in the corpus 110 as a whole. If the term appears in multiple program artifacts, then the highest TF-IDF value calculated with respect to program artifact 115 may be used for this feature.

For example, language-independent features represented in a feature vector may be one or more of the following, particularly for program artifacts 115 written in COBOL: relatedness to a copybook, relatedness to a database, relatedness to business logic, and relatedness to imported keywords.

Relatedness to a copybook refers to a measurement of similarity between the term and a COBOL copybook file. A copybook is a program artifact 115 that defines data elements referenced by other program artifacts 115. A term that is related to a copybook is likely to be a keyword. To determine relatedness to a copybook, each term found in each copybook may be compared to the term in question, and the greatest similarity between these comparisons may be used as the value of this feature. In some embodiments of the invention, an edit distance, such as the Levenshtein distance, may be used as the measure of similarity between terms when determining the value of this feature or others. Thus, the highest Levenshtein distance between the term in question and each of the various terms in the copybooks of the corpus 110 may be used as the value of this feature. For example, and not by way of limitation, this feature may be a value in the range [0, 1], with a value of 0 indicating no similarity and a value of 1 indicating equality between the term in question and any term in a copybook of the corpus 110.

Relatedness to a database refers to a measurement of similarity between the term in question and a database. A term appearing in a database, such as a table name or a column name, is likely to be a keyword. As with relatedness to a copybook, the term may be compared to each term found in one or more databases of the corpus, and the highest similarity value may be used as the value of this feature.

Relatedness to user interface (UI) labels and statements refers to the similarity between the term in question and labels and statements associated with a UI. A term related to a UI is likely to be a keyword. The program artifacts 115, particularly MAP files, for example, may indicate UI labels and statements. As with relatedness to a copybook, the term in question may be compared to each term found in one or more UI labels and statements of the corpus, and the highest similarity value may be used as the value of this feature.

Relatedness to business logic statements refers to the similarity between the term in question in the various business logic statements identified in the corpus. If a term is involved in a business logic statement, then it is likely to be a keyword. For instance, according to some embodiments of the invention, a business logic statement may appear in the program artifacts 115 as a conditional statement, a statement involving one or more tables or arrays, or a SQL statements. It will be understood that a mechanism for identification of a business logic statement in the program artifacts 115 may vary between embodiments. As with relatedness to a copybook, the term may be compared to each term found in each business logic statement, and the highest similarity value may be used as the value of this feature.

Relatedness to imported keywords refers to the similarity between a term in question and known keywords. In some embodiments of the invention, one or more keywords may be known, due to having been submitted as keywords by a user or having been previously identified as keywords. As with relatedness to a copybook, the term may be compared to each known keyword, and the highest similarity value may be used as the value of this feature.

For example, to illustrate the structure of a feature vector, following is an example feature vector for the term "Patient-ID," where the feature vector incorporates each of the features described above as a numeric value. In this example, variations of the sub-term "Patient" appear in various places, such as in a database table header, the user interface, and one or more copybooks.

```
{
    "Length" : "10"
    "TermFrequency" : "1"
    "DocumentFrequency" : "1233"
    "FirstAppearance" : "39"
    "TFxIDF" : "0.071624"
    "RelatednessToCopybook" : "0.809524"
    "RelatednessToDatabase" : "0.910248"
    "RelatednessToUI" : "0.910248"
    "RelatednessToBusinessLogic" : "0.701523"
    "RelatednessToKeywords" : "0.701523"
}
```

For each term received as input, the feature builder 150 may construct a feature vector using the above or other features. The number of dimensions in the feature vectors, as well as the features incorporated, need not be as described herein. Rather, the features described above as included in the feature vector are provided for illustrative purposes only, and it will be understood that the size and features of the feature vector may vary from one embodiment to another. In some embodiments of the invention, the features considered may be fixed through training of the classification model 120 and assignment of confidence levels 160. However, a value of a feature for a particular term may be left unassigned, or null, if that value cannot be established. A feature vector may be viewed as a description of the corresponding term and may be used to determine the confidence level 160 that the term is a keyword. Specifically, the classification model 120 may map a feature vector for a term to a confidence level 160 for the term.

Figure 2:
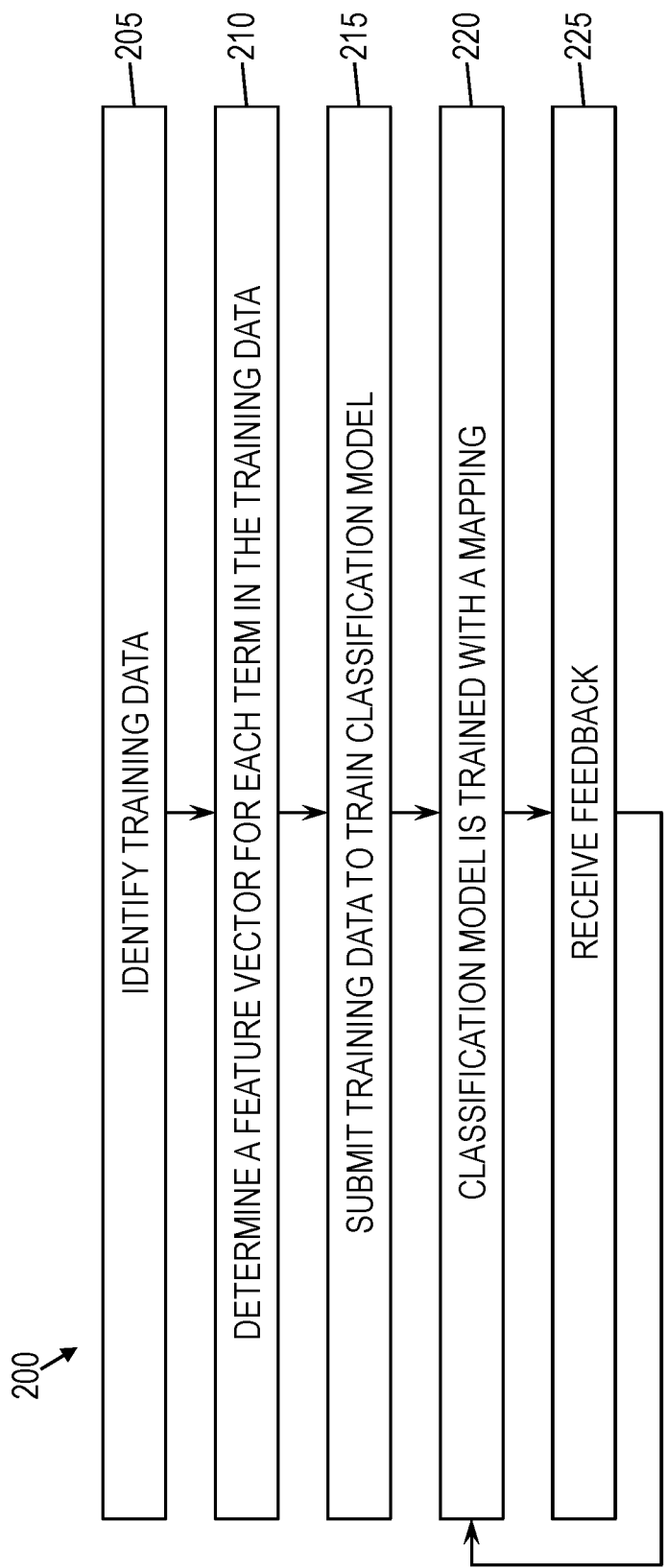
FIG. 2 is a flow diagram of a method of training a classification model to predict keywords, according to some embodiments of the invention.

FIG. 2 is a flow diagram of a method 200 of training the classification model 120 to learn a mapping 125 from feature vectors to corresponding confidence levels 160, according to some embodiments of the invention. The mapping 125 need not be a one-to-one mapping. Rather, each feature vector may map to a single confidence level 160, but a confidence level 160 may be mapped to by one or more feature vectors, or by no feature vectors.

As shown in FIG. 2, at block 205, training data 130 may be identified. The training data 130 may include a plurality of terms and an indication of whether each term is a keyword or not. In some embodiments of the invention, the training data 130 includes training program artifacts 115, which are tokenized by the tokenizer 140 to extract the terms for training. In some embodiments of the invention, the training program artifacts 115 are part of the corpus 110 from which keywords are being predicted. To establish whether each term in the training data 130 is a keyword, the terms may be labeled in the training data 130 with indications of whether each term is a keyword. This labeling may be performed manually or by way of automated comparison to a set of known keywords.

At block 210, a feature vector may be determined for each term in the training data 130. In some embodiments of the invention, the feature builder 150 builds each feature vector for each term, based on the program artifacts 115 in the corpus 110. Alternatively, however, the training data 130 may include a feature vector for each term already.

At block 215, the training data 130 may be submitted to the classification model 120 for training of the classification model 120 by way of machine learning. Specifically, for each term in the training data 130, the corresponding feature vector and confidence level 160 may be submitted to the classification model 120 for training. For this purpose, terms that are known to be keywords may be assigned a confidence level 160 of 1, while terms that are known not to be keywords may be assigned a confidence level 160 of 0, or vice versa.

At block 220, as a result of the training data 130, the classification model 120 is trained, resulting in an established mapping 125 from feature vectors to confidence levels 160. In some embodiments of the invention, a logistic regression model is used for the training, because this is a predictive classification model 120 that suits the scale and characteristics of the feature vectors described in this disclosure. The training data 130 may thus be used to train coefficients representing the features of the feature vectors. However, it will be understood that other classification models 120 may also be used, such as a support vector machine, a decision tree, or a random forest.

In some cases, the number of known keywords is few, and thus the training data 130 is relatively small. This could lead to overfitting problems in the classification model 120. Thus, in some embodiments of the invention, regularization is used with the logistic regression model to yield a more general result.

The classification model 120 may continuously learn from new training data 130 provided to it. Thus, at block 225, feedback may be received to be used as new or updated training data 130 for the classification model 120. Such feedback will be described in more detail below, but generally, the feedback may include one or more terms and corresponding confidence levels 160, such as additional terms labeled as keywords. Upon receipt of this feedback, the classification model 120 may be updated at block 220, through retraining or fine-tuning.

Figure 3:
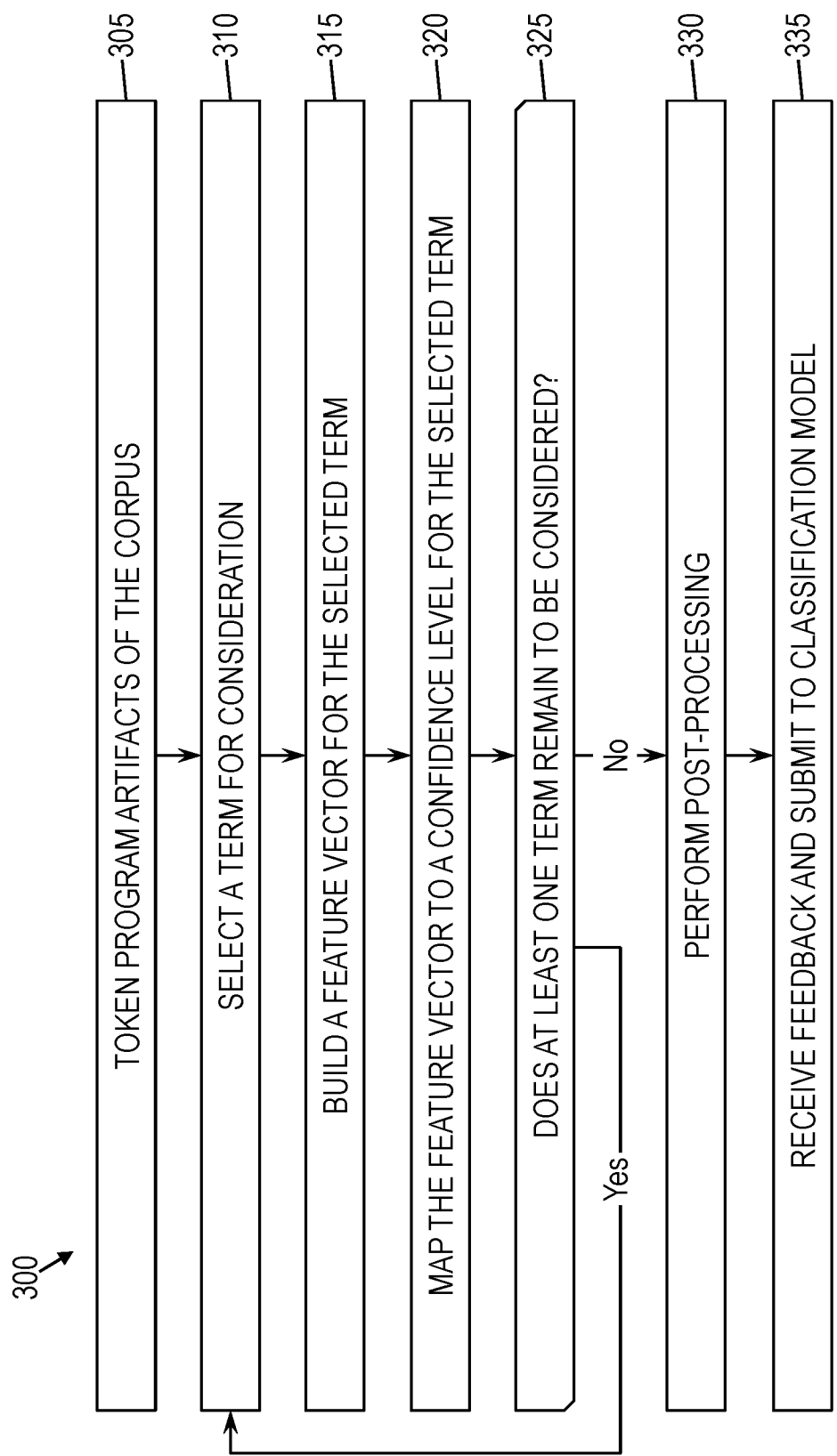
FIG. 3 is a flow diagram of method of predicting keywords in program artifacts, according to some embodiments of the invention.

FIG. 3 is a flow diagram of a method 300 for identifying keywords in program artifacts 115 of the corpus 110, according to some embodiments of this invention. This method 300 may use the classification model 120 that was previously trained.

At block 305, the various program artifacts 115 of the corpus 110 may be tokenized into a plurality of terms. In some embodiments of the invention, these resulting terms may exclude reserved terms. At block 310, a term may be selected for consideration. Each of the terms resulting from tokenization may be selected at some point, and blocks 315-320 below may be performed on each of such terms individually. The focus on each term may be performed, for example, in serial or in parallel.

At block 315, a feature vector may be built for the selected term. To this end, for each feature to be included in the feature vector, the feature builder 150 may determine the value of the feature based on the various program artifacts 115 in the corpus 110.

At block 320, the feature vector may be mapped to a confidence level 160, according to the trained classification model 120. The resulting confidence level 160 may represent the likelihood that the selected term is a keyword.

At decision block 325, it may be determined whether at least one additional term remains to be assigned a confidence level 160. If so, then the method 300 may return to block 310 to select another term. If no additional terms exist, then the method 300 may continue to block 330 for post-processing.

After the various terms to be considered have been assigned confidence levels 160, at block 330, post-processing may be performed. Post-processing may involve various activities depending on the purpose and goals of the prediction system 100. For example, and not by way of limitation, the various terms may be ranked according to their confidence levels 160, such that a user can later utilize this ranking in business mining tasks. For another example, each term with a confidence level 160 meeting a threshold level may be considered a keyword. In some embodiments of the invention, terms deemed to be keywords may be grouped together based on similarity, such as having a string in common. In that case, the longest string in common within a group may be extracted to represent the group as a whole. This longest string may be deemed a business term. Business terms, other keywords, or both may be output or may be used to generate a description of the corpus 110 as a whole, thus enabling a user to better understand the function of a legacy application or other application represented by the corpus 110.

At block 335, feedback may be received and submitted to the classification model 120. As discussed above, feedback may be used to update training of the classification model 120. This feedback may take the form of an adjustment, such as a manual adjustment, to the confidence levels 160 of one or more terms or to the ranking of terms based on their confidence levels 160. For example, and not by way of limitation, the prediction system 100 may receive a manual change to the ranking of terms based on confidence levels 160, and this manual change may be interpreted as a change to at least one confidence level 160. For instance, if a first term was automatically ranked below a second term but is manually moved above the second term, then the prediction system 100 may interpret this change as a change to the confidence level 160 of the first term. The confidence level 160 of the first term may then be set to a value between the second term, which is now below the first term, and the term now ranked immediately above the first term. Each adjustment to a confidence level 160 may be submitted to the classification model 120 as additional training data 130, to update the classification model 120 and its associated mapping 125.

In some embodiments of the invention, the accuracy and precision of the classification model 120 may be evaluated. Precision, recall, and F-measure are evaluation metrics in the field of information retrieval, and these can be used to evaluate the performance of keyword prediction. In some embodiments of the invention, a sample of terms along with predicted keywords (e.g., terms having confidence levels 160 meeting a threshold level) among those terms may be verified, using manual verification or some other process of verification. Precision is the fraction of actual keywords among the predicted keywords. For instance, of ten terms that are returned as predicted keywords, if only three are real keywords, then the precision is $3/10=30\%$. The recall is the fraction of real keywords that are properly predicted. For example, if there are one hundred real keywords in the sample, but only twenty are predicted, then the recall is $20/100=20\%$. F-measure combines precision and recall as their harmonic mean value. Based on these metrics, users can gain an understanding of the trustworthiness of the classification model 120. Further, it can be determined whether additional training data 130 is needed to improve the classification model 120.

Figure 4:
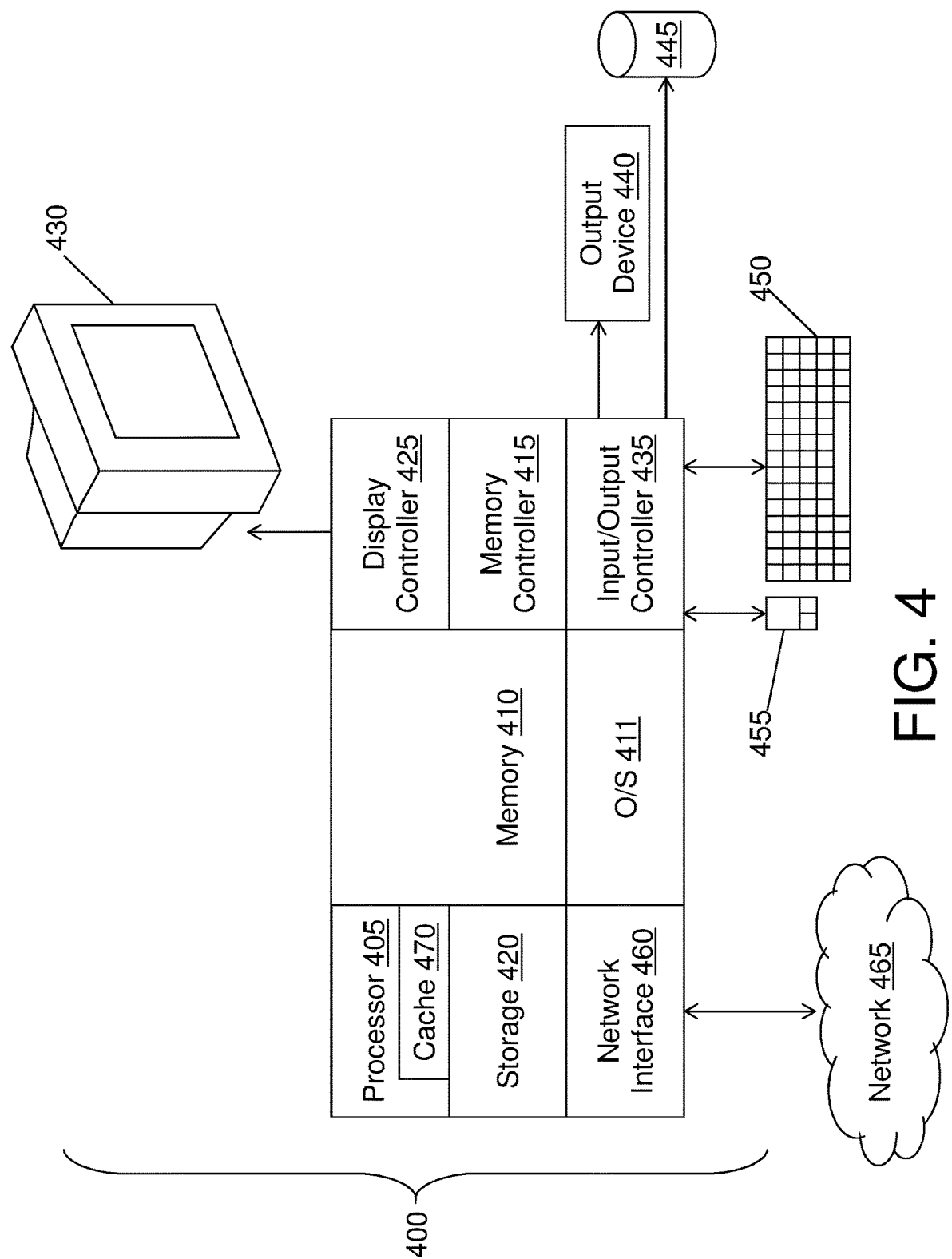
FIG. 4 is a block diagram of a computer system for implementing some or all aspects of the prediction system, according to some embodiments of this invention.

FIG. 4 is a block diagram of a computer system 400 for implementing some or all aspects of the system, according to some embodiments of this invention. The prediction systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the prediction systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Prediction systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   training a classification model to produce a mapping from a set of feature vectors to a set of confidence levels, wherein each feature vector describes a respective term, and wherein each confidence level indicates a likelihood that the respective term is a keyword;
   tokenizing a plurality of program artifacts into a plurality of terms; and
   for each term in the plurality of terms:
      determining a respective feature vector describing the term, based on the plurality of program artifacts, wherein each respective feature vector of the plurality of terms comprises at least one language-independent feature and at least one language-dependent feature, wherein the at least one language-dependent feature is determined based upon a programming language of the plurality of program artifacts; and
      determining, based on the respective feature vector, using the mapping, a respective confidence level indicating a likelihood that the term is a keyword of the plurality of program artifacts.

2. The computer-implemented method of claim 1, further comprising ranking the plurality of terms according to the respective confidence levels of the plurality of terms.

3. The computer-implemented method of claim 2, further comprising:
   receiving a modification to the ranking of the plurality of terms; and
   modifying at least one confidence level of the plurality of terms, based on the modification to the ranking.

4. The computer-implemented method of claim 1, wherein the training the classification model to produce the mapping comprises submitting training data to the classification model, and wherein the training data comprises a plurality of known terms labeled as keywords.

5. The computer-implemented method of claim 4, further comprising:
   ranking the plurality of terms according to the respective confidence levels of the plurality of terms;
   receiving a modification to the ranking of the plurality of terms;
   modifying at least one confidence level of the plurality of terms, based on the modification to the ranking; and
   updating the training data to refine the classification model based on the modification of the at least one confidence level.

6. The computer-implemented method of claim 1, further comprising identifying as a keyword each term having a respective confidence level that meets a threshold level.

7. A system comprising:
   a memory having computer-readable instructions; and
   one or more processors for executing the computer-readable instructions, the computer-readable instructions comprising:

training a classification model to produce a mapping from a set of feature vectors to a set of confidence levels, wherein each feature vector describes a respective term, and wherein each confidence level indicates a likelihood that the respective term is a keyword;

tokenizing a plurality of program artifacts into a plurality of terms; and for each term in the plurality of terms:
- determining a respective feature vector describing the term, based on the plurality of program artifacts, wherein each respective feature vector of the plurality of terms comprises at least one language-independent feature and at least one language-dependent feature, wherein the at least one language-dependent feature is determined based upon a programming language of the plurality of program artifacts; and
- determining, based on the respective feature vector, using the mapping, a respective confidence level indicating a likelihood that the term is a keyword of the plurality of program artifacts.

8. The system of claim 7, the computer-readable instructions further comprising ranking the plurality of terms according to the respective confidence levels of the plurality of terms.

9. The system of claim 8, the computer-readable instructions further comprising:
- receiving a modification to the ranking of the plurality of terms; and
- modifying at least one confidence level of the plurality of terms, based on the modification to the ranking.

10. The system of claim 7, wherein the training the classification model to produce the mapping comprises submitting training data to the classification model, and wherein the training data comprises a plurality of known terms labeled as keywords.

11. The system of claim 10, the computer-readable instructions further comprising:
- ranking the plurality of terms according to the respective confidence levels of the plurality of terms;
- receiving a modification to the ranking of the plurality of terms;
- modifying at least one confidence level of the plurality of terms, based on the modification to the ranking; and
- updating the training data to refine the classification model based on the modification of the at least one confidence level.

12. The system of claim 7, the computer-readable instructions further comprising identifying as a keyword each term having a respective confidence level that meets a threshold level.

13. A computer-program product for predicting keywords, the computer-program product comprising a computer-readable storage medium having program instructions embodied therewith, the program instructions executable by a processor to cause the processor to perform a method comprising:
training a classification model to produce a mapping from a set of feature vectors to a set of confidence levels, wherein each feature vector describes a respective term, and wherein each confidence level indicates a likelihood that the respective term is a keyword;

tokenizing a plurality of program artifacts into a plurality of terms; and for each term in the plurality of terms:
- determining a respective feature vector describing the term, based on the plurality of program artifacts, wherein each respective feature vector of the plurality of terms comprises at least one language-independent feature and at least one language-dependent feature, wherein the at least one language-dependent feature is determined based upon a programming language of the plurality of program artifacts; and
- determining, based on the respective feature vector, using the mapping, a respective confidence level indicating a likelihood that the term is a keyword of the plurality of program artifacts.

14. The computer-program product of claim 13, the method further comprising ranking the plurality of terms according to the respective confidence levels of the plurality of terms.

15. The computer-program product of claim 14, the method further comprising:
- receiving a modification to the ranking of the plurality of terms; and
- modifying at least one confidence level of the plurality of terms, based on the modification to the ranking.

16. The computer-program product of claim 13, wherein the training the classification model to produce the mapping comprises submitting training data to the classification model, and wherein the training data comprises a plurality of known terms labeled as keywords.

17. The computer-program product of claim 16, the method further comprising:
- ranking the plurality of terms according to the respective confidence levels of the plurality of terms;
- receiving a modification to the ranking of the plurality of terms;
- modifying at least one confidence level of the plurality of terms, based on the modification to the ranking; and
- updating the training data to refine the classification model based on the modification of the at least one confidence level.

* * * * *